(12) United States Patent
Scott et al.

(10) Patent No.: US 8,478,917 B2
(45) Date of Patent: Jul. 2, 2013

(54) AUTOMATIC ADDRESSING PROTOCOL FOR A SHARED BUS

(75) Inventors: James Scott, Cambridge (GB); Nicolas Villar, Cambridge (GB); Michael David Hazas, Lancaster (GB); Stephen Edward Hodges, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 292 days.

(21) Appl. No.: 12/888,042

(22) Filed: Sep. 22, 2010

(65) Prior Publication Data
US 2012/0072626 A1 Mar. 22, 2012

(51) Int. Cl.
*G06F 13/00* (2006.01)

(52) U.S. Cl.
USPC ............. 710/104; 710/9; 710/110

(58) Field of Classification Search
USPC .................. 710/8–10, 104, 110
See application file for complete search history.

(56) References Cited

U.S. PATENT DOCUMENTS

| | | | |
|---|---|---|---|
| 4,712,590 A | 12/1987 | Gianfilippo | |
| 4,965,550 A | 10/1990 | Wroblewski | |
| 5,204,669 A * | 4/1993 | Dorfe et al. | 340/9.16 |
| 5,357,621 A * | 10/1994 | Cox | 711/172 |
| 5,367,300 A | 11/1994 | Fong et al. | |
| 5,404,460 A * | 4/1995 | Thomsen et al. | 710/9 |
| 5,963,454 A | 10/1999 | Dockser et al. | |
| 6,026,221 A | 2/2000 | Ellison et al. | |
| 6,487,400 B2 | 11/2002 | Joeressen et al. | |
| 6,553,437 B1 * | 4/2003 | Aswell et al. | 710/9 |
| 6,629,172 B1 * | 9/2003 | Andersson et al. | 710/104 |
| 6,684,362 B1 | 1/2004 | Currier et al. | |
| 6,691,183 B1 | 2/2004 | Ryan, Jr. | |
| 6,917,998 B1 | 7/2005 | Giles | |

(Continued)

FOREIGN PATENT DOCUMENTS

WO WO2010059150 A1 5/2010

OTHER PUBLICATIONS

Beigl, et al., "Smart-Its: An Embedded Platform for Smart Objects", available at least as early as Nov. 28, 2006, at <<http://www.cc.gatech.edu/computing/classes/AY2004/cs4470_fall/readings/smart-its-soc2003.pdf>>, pp. 4.

(Continued)

*Primary Examiner* — Glenn A Auve
(74) *Attorney, Agent, or Firm* — Zete Law, P.L.L.C.; MacLane C. Key

(57) ABSTRACT

An automatic addressing protocol for a shared bus is described. In an embodiment, devices connected in a chain by a shared bus are also connected by an independent electrical connection between each pair of neighboring devices. A protocol is used over the independent electrical connections which is independent of that used on the shared bus. Devices in the chain receive at least one device ID from an upstream neighbor via the independent electrical connection and either use this received ID as their ID or use the received ID to compute their ID. Where the device has a downstream neighbor, a device then transmits at least one device ID to the downstream neighbor via the independent electrical connection and this transmitted ID may be their ID or an ID generated based on their ID, for example, by incrementing the ID by one. The process is repeated by devices along the chain.

17 Claims, 12 Drawing Sheets

U.S. PATENT DOCUMENTS

| | | | |
|---|---|---|---|
| 6,973,591 B2 | 12/2005 | Debling | |
| 7,035,344 B2 | 4/2006 | Feher | |
| 7,035,693 B2 | 4/2006 | Cassiolato et al. | |
| 7,085,863 B2* | 8/2006 | Barenys et al. | 710/104 |
| 7,089,173 B1 | 8/2006 | Molson et al. | |
| 7,328,286 B2* | 2/2008 | Vinnemann | 710/9 |
| 7,376,771 B1 | 5/2008 | Brabant et al. | |
| 7,587,539 B2* | 9/2009 | Picard et al. | 710/104 |
| 7,752,353 B2 | 7/2010 | Perry et al. | |
| 8,195,839 B2* | 6/2012 | Pyeon et al. | 710/9 |
| 8,205,017 B2* | 6/2012 | Parr et al. | 710/9 |
| 2002/0059054 A1 | 5/2002 | Bade et al. | |
| 2002/0094803 A1 | 7/2002 | Burgan et al. | |
| 2003/0009453 A1 | 1/2003 | Basso et al. | |
| 2003/0014540 A1 | 1/2003 | Sultan et al. | |
| 2003/0066082 A1 | 4/2003 | Kliger et al. | |
| 2003/0074180 A1 | 4/2003 | Shibayama et al. | |
| 2003/0206503 A1 | 11/2003 | Kosoburd et al. | |
| 2004/0246961 A1 | 12/2004 | Dai et al. | |
| 2005/0038665 A1 | 2/2005 | Hasebe | |
| 2005/0077355 A1 | 4/2005 | Yamamoto et al. | |
| 2005/0114710 A1 | 5/2005 | Cornell et al. | |
| 2005/0246469 A1 | 11/2005 | Chu | |
| 2006/0121931 A1 | 6/2006 | Lin et al. | |
| 2006/0125485 A1 | 6/2006 | Casey | |
| 2007/0065148 A1 | 3/2007 | Behr et al. | |
| 2008/0132291 A1 | 6/2008 | Barr et al. | |
| 2008/0242287 A1 | 10/2008 | Luciani | |
| 2009/0100198 A1 | 4/2009 | Zatelman et al. | |
| 2010/0185784 A1* | 7/2010 | De Nie et al. | 710/9 |

OTHER PUBLICATIONS

Beutel, et al., "PrototypingWireless Sensor Network Applications with BTnodes", available at least as early as Nov. 28, 2006, at <<http://www.vs.inf.ethz.ch/res/papers/prototyping-btnode.pdf>>, pp. 16.

Costa, et al., "Towards a Services Platform for Mobile Context-Aware Applications", available at least as early as Nov. 28, 2006, at <<http://wwwhome.cs.utwente.nl/~pires/publications/iwcu2004.pdf>>, pp. 14.

Girod, et al., "EmStar: a Software Environment for Developing and Deploying Wireless Sensor Networks", retrieved on Nov. 28, 2006, at <<http://www.usenix.org/events/usenix04/tech/general/full_papers/girod/girod_html/eu.htmlu>>, Lewis Girod, 2004, pp. 27.

Hodges, et al., "wasp: a platform for prototyping ubiquitous computing devices", 2006, pp. 2.

Ke, et al., "Semantic Internetworking of Sensor Systems", retrieved on Jul. 20, 2010 at <<http://ieeexplore.ieee.org/stamp/stamp.jsp?arnumber=01392189>>, IEEE, International Conference on Mobile Ad-hoc and Sensor Systems, Fort Lauderdale, Florida, Oct. 2004, pp. 484-492.

Lister, et al., "A SystemC based Virtual Prototyping Methodology for Embedded Systems", retrieved on Nov. 28, 2006, at <<http://www.us.design-reuse.com/articles/article11104.html>>, Design and Ruse S.A., 2006, pp. 10.

"Virtual Platforms", retrieved on Nov. 28, 2006, at <<http://www.virtio.com/products/virtualPlatforms/0,2261,0,00.html>>, Virtio, 1999-2006, pp. 2.

* cited by examiner

AUTOMATIC ADDRESSING PROTOCOL FOR A SHARED BUS

BACKGROUND

Many devices are formed by connecting multiple hardware components together, e.g. within a computer, the motherboard is connected to the hard drive, graphics card, network card etc. Usually one hardware component is acts as the master and the other devices are slaves. In order to electrically connect the components together, each slave component can be connected separately to the master component in a star formation; however this arrangement involves a lot of wiring and becomes unwieldy where there are a large number of slaves. An alternative solution is to use a shared data bus, which allows many components to be connected together in a manner which is physically much easier to manage. As a shared medium is being used to communicate between the master and slaves, each slave needs to have a unique identifier which can be used to address the slave and enables the master to individually control each slave. These identifiers for different components are typically set manually using a series of small switches or jumpers on the components or by setting the position of a rotary switch using a screwdriver.

The embodiments described below are not limited to implementations which solve any or all of the disadvantages of known methods of interconnecting groups of devices.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

An automatic addressing protocol for a shared bus is described. In an embodiment, devices connected in a chain by a shared bus are also connected by an independent electrical connection between each pair of neighboring devices. A protocol is used over the independent electrical connections which is independent of that used on the shared bus. Devices in the chain receive at least one device ID from an upstream neighbor via the independent electrical connection and either use this received ID as their ID or use the received ID to compute their ID. Where the device has a downstream neighbor, a device then transmits at least one device ID to the downstream neighbor via the independent electrical connection and this transmitted ID may be their ID or an ID generated based on their ID, for example, by incrementing the ID by one. The process is repeated by devices along the chain.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
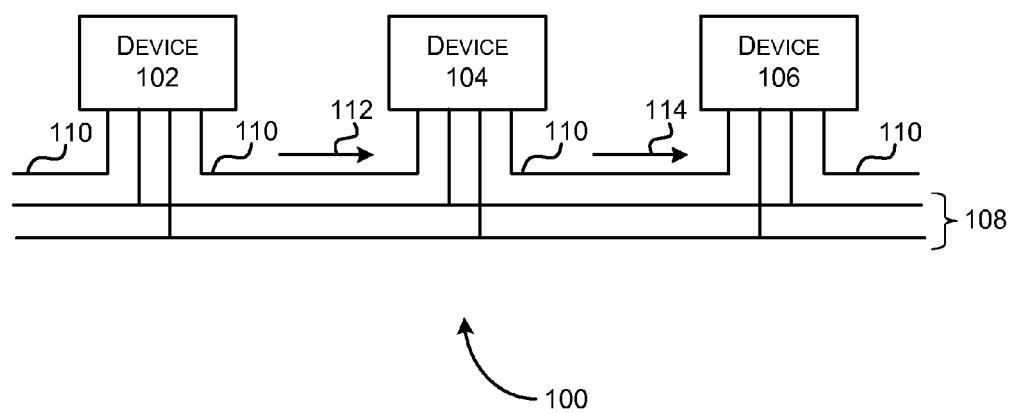
FIG. 1 is a schematic diagram of an example system comprising a plurality of devices connected together using a shared bus.

FIG. 1 is a schematic diagram of an example system 100 comprising a plurality of devices (or components) 102, 104, 106 connected together using a shared bus 108. Each device (which may also be referred to as a 'node') may, for example, be a slave peripheral device (e.g. LED, motor, sensor, display, Ethernet interface, etc) connected to a master device (e.g. comprising a processor). In the example system 100, one of the devices (e.g. device 102) may be the master device, another device (not shown in FIG. 1) may be the master or there may be no master device.

In the example shown in FIG. 1, the shared bus 108 comprises two wires and each device has two connections to the shared bus and the shared bus may, for example, use the I²C standard; however, alternative shared bus standards and arrangements may alternatively be used. In some examples, the devices may be connected by the shared bus in a 'daisy-chain' wiring configuration where each component has two connectors. In addition to being connected by the shared bus 108, the devices 102-106 are connected by an independent electrical connection 110 (which may comprise a single wire) between each pair of neighboring devices and this may be referred to as a 'neighbor bus'. The independence of these connections refers to the fact that a connection between two neighbors is electrically independent of both the shared bus and of the connections between other pairs of neighbors. The protocol used on these independent electrical connections 110 is, in many examples, independent of the protocol used on the shared bus 108 (and hence can be used with any type of shared bus) and this neighbor bus protocol is described in more detail below. In some examples, however, the protocol used on the neighbor bus may work together with the protocol used on the shared bus.

Figure 2:
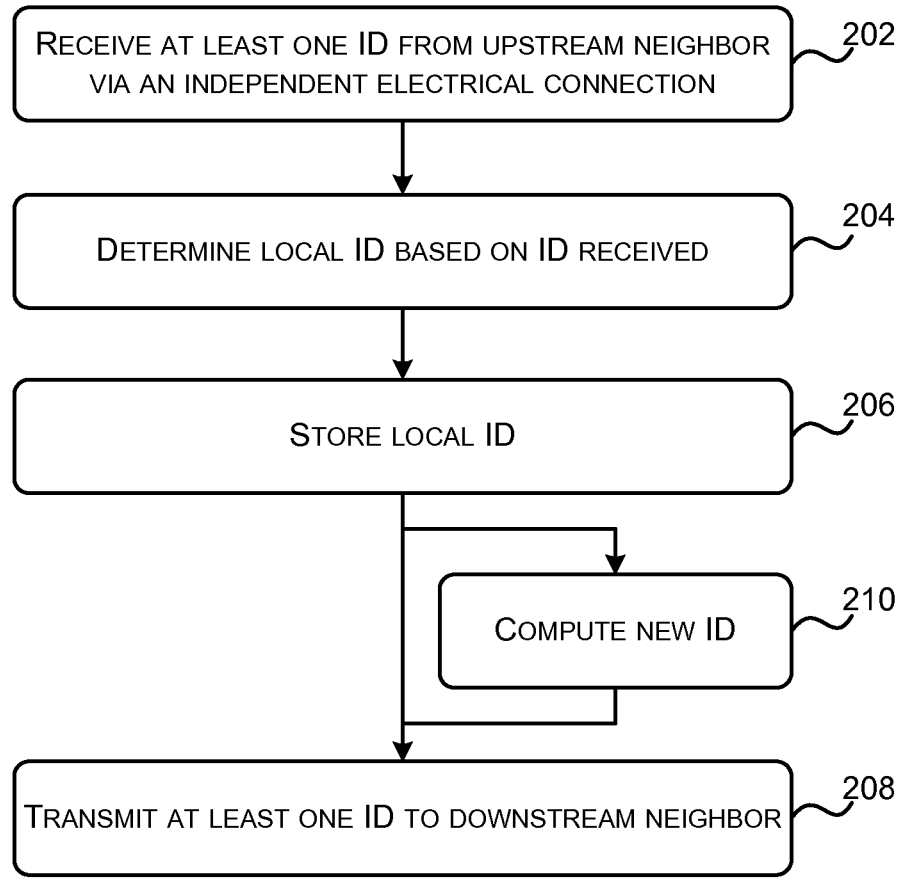
FIGS. 2-4 comprise flow diagrams of example methods of automatic address assignment for devices connected by a shared bus and by a neighbor bus.

FIG. 2 comprises a flow diagram of an example method of automatic address assignment for devices (e.g. devices 102-106 in the system of FIG. 1) connected by a shared bus 108 and by a neighbor bus 110. A device (which may be any slave device in the chain) receives at least one device identifier (ID) from an upstream neighbor device (block 202) via the neighbor bus 110, e.g. device 104 may receive a device ID from device 102, as indicated by arrow 112. The receiving device (e.g. device 104) then uses the device ID (or IDs) received (in block 202) to determine and then store an ID (blocks 204 and 206) which will be used as the address of that device (which may be referred to as the local ID). This may be considered as the device augmenting its state based on the received ID.

There are many ways in which the ID of a device may be determined (in block 204) based on the ID (or IDs) received (in block 202) and various examples are described below. In a first example, a single device ID may be received and this received ID may be used as the local ID and stored (in block 206). In other examples, the local ID (or local address) may be different from the received ID and in such examples, the step of determining the local ID may involve incrementing the received ID (e.g. so that a device which received an ID of '1' may determine that its ID is '2') or using other deterministic methods, (e.g. incrementing by a different amount or applying a predefined formula), or computing an ID using a degree of random selection.

Having determined its local ID, the device may then transmit an ID (or multiple IDs) to a downstream neighbor (block 208, e.g. to device 106) via the neighbor bus 110 (as indicated by arrow 114) and the process (as shown in FIG. 2) may be repeated by each device along the chain in turn. The ID transmitted (in block 208) may be the local ID (as determined in block 204) or may involve a computation step (block 210). In an example implementation of the protocol, a slave device uses an ID received from an upstream neighbor (in block 202) as its local ID (as determined in block 204) and then computes (in block 210) a new ID which will become the local ID of its downstream neighbor. In another example implementation, a slave device determines its local ID (in block 204) based on the received ID but such that the local ID is not the same as the received ID, e.g. the received ID is incremented by one. In such an example, the device may transmit its local ID to its downstream neighbor (in block 208, omitting block 210) which will, in turn, generate its own local ID in a similar manner. In most example implementations, the ID received by a device (in block 202) from its upstream neighbor will not be the same as the ID transmitted (in block 208) to its downstream neighbor.

Where the device receives multiple IDs (in block 202), the set of IDs received may comprise a set of IDs which can be used and the device may select one of the received IDs as its ID (in block 204). In another example, the set of IDs received may comprise the IDs of all the upstream devices and the device may (in block 204) select an ID (e.g. deterministically or at random) which is not equal to any of the device IDs received. In another example, the set of IDs may comprise an ID for the device or for the preceding device and one or more IDs which cannot be used in the chain (e.g. because they are allocated to particular devices as described in more detail below with reference to FIG. 10). In examples where multiple IDs are transmitted and received, the IDs transmitted to a downstream neighbor (in block 208) may be a subset of the IDs received or include all of the IDs received.

Through use of the independent electrical connections 110 between neighbor devices and the protocol shown in FIG. 2, unique addresses can be assigned automatically to each device in the chain. Once unique addresses have been assigned, these addresses can be used for communication over the shared bus 108. This avoids the need for manual assignment of addresses whilst enabling the use of a shared bus (and avoiding the bulky alternative of individual wiring from a master to each slave device).

Depending on the method used to determine the local IDs (in block 204) and where appropriate to compute new IDs (in block 210), the assigned addresses can correlate (or map) to the position of devices in the chain, e.g. the first slave device in the chain (e.g. device 102) has an ID '1', the second (e.g. device 104) has an ID '2', the third (e.g. device 106) has an ID '3' etc. In another example, where each device forwards its ID along with the IDs of any upstream neighbor devices to a downstream neighbor device (e.g. device 104 transmits the IDs of devices 102 and 104 to device 106), a device knows its position in the chain based on the number of IDs received.

In an example scenario, a device designer could connect up 100 light emitting diodes (LEDs) in a 10×10 grid with the electrical connector running along one row, down one, back along the next row, down one, and so on. This minimizes wiring compared to a "star" arrangement where each LED is wired back to the master (and the master does not need to have 100 peripheral connectors). Using the methods described above, each LED is automatically assigned an address which can correspond to its physical position and this means that the designer does not have to program each LED with its own address and can easily map between the location that they wish to light up with the address of the LED at that location. Furthermore, if an LED fails, it is easy to swap it out for a new one, as described in more detail below.

The automatic addressing may be initiated by a master device, where there is one. In such an example system, the master may transmit an initial ID (or set of IDs) to the first slave in the chain of devices. Depending on the method used to determine the local IDs (in block 204), this initial ID (e.g. an ID of '1') may become ID of the first slave in the chain of devices or may be a priming ID (e.g. an ID of '0') where the ID received by a slave device (in block 202) is not the same as the local ID stored (in block 206). The methods are also applicable where there is no master device and an example method of operation of a system which does not comprise a master is described below.

The protocol (e.g. as shown in FIG. 2) and neighbor bus 110 enables devices to be switched out and replaced as required (e.g. if one becomes faulty). Using the protocol, a replacement device automatically acquires an address and where a deterministic method of determining new IDs is used (in block 204 or 210), a replacement device automatically acquires the same address as the device which it replaced. There are many ways in which the system 100 may be triggered to perform the automatic assignment of an address to the replacement device. In a first example, the replacement device may generate an interrupt which causes the master to trigger automatic address assignment (e.g. by repeating the transmission of the initial ID to the first slave). In a second example, the method shown in FIG. 2 may be performed periodically (e.g. it may be periodically repeated) so that a replacement device will automatically be assigned an address the next time the method is performed. In a third example, keep alive messages may be sent by devices to their neighbor devices over the neighbor bus and the absence of such keep alive messages received from a downstream neighbor for a defined period of time may trigger the upstream device to resend the ID (as in block 208) once the presence of an downstream device is detected again (e.g. through receipt of a further keep alive message).

Figure 3:
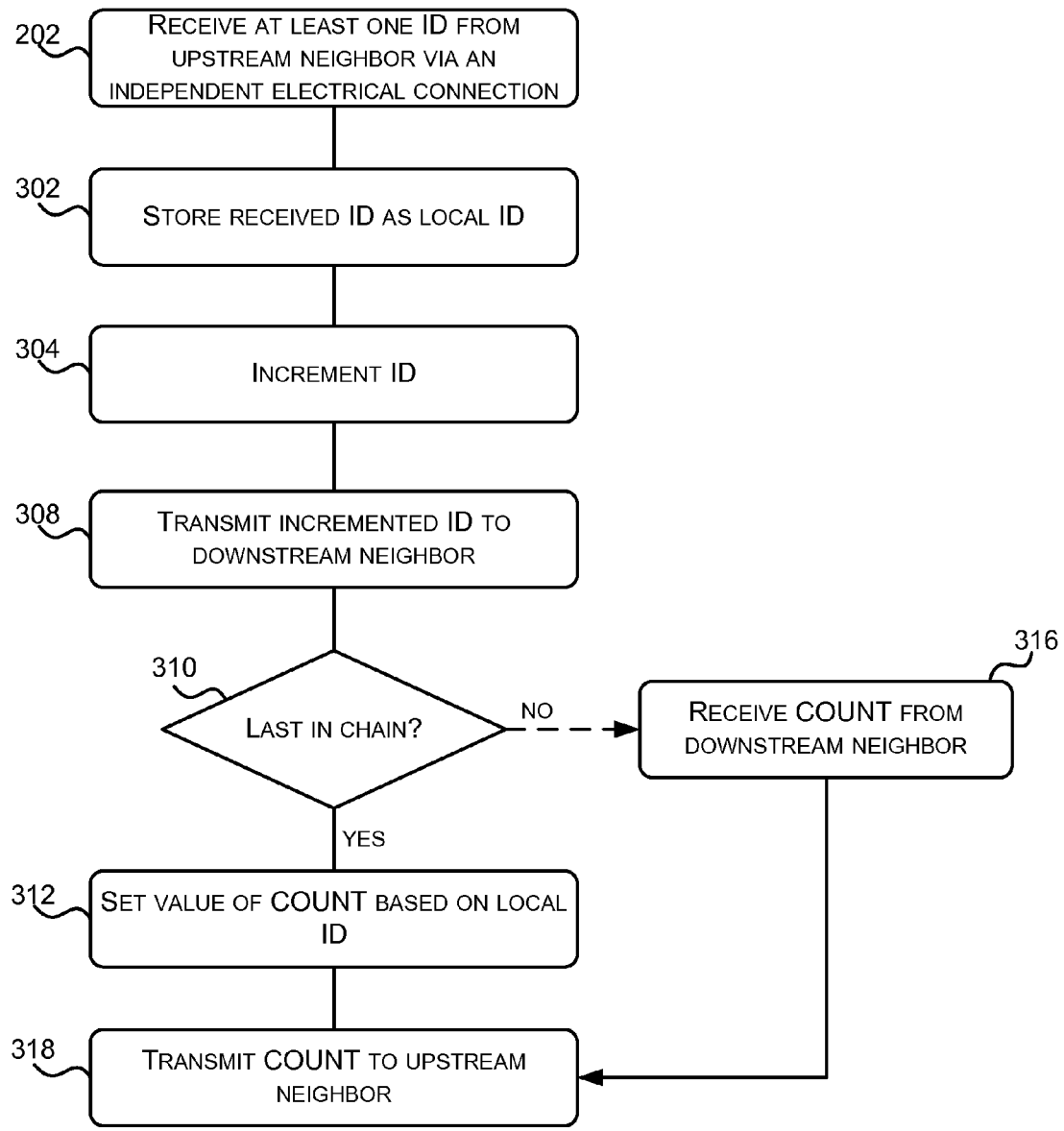
Figure 4:
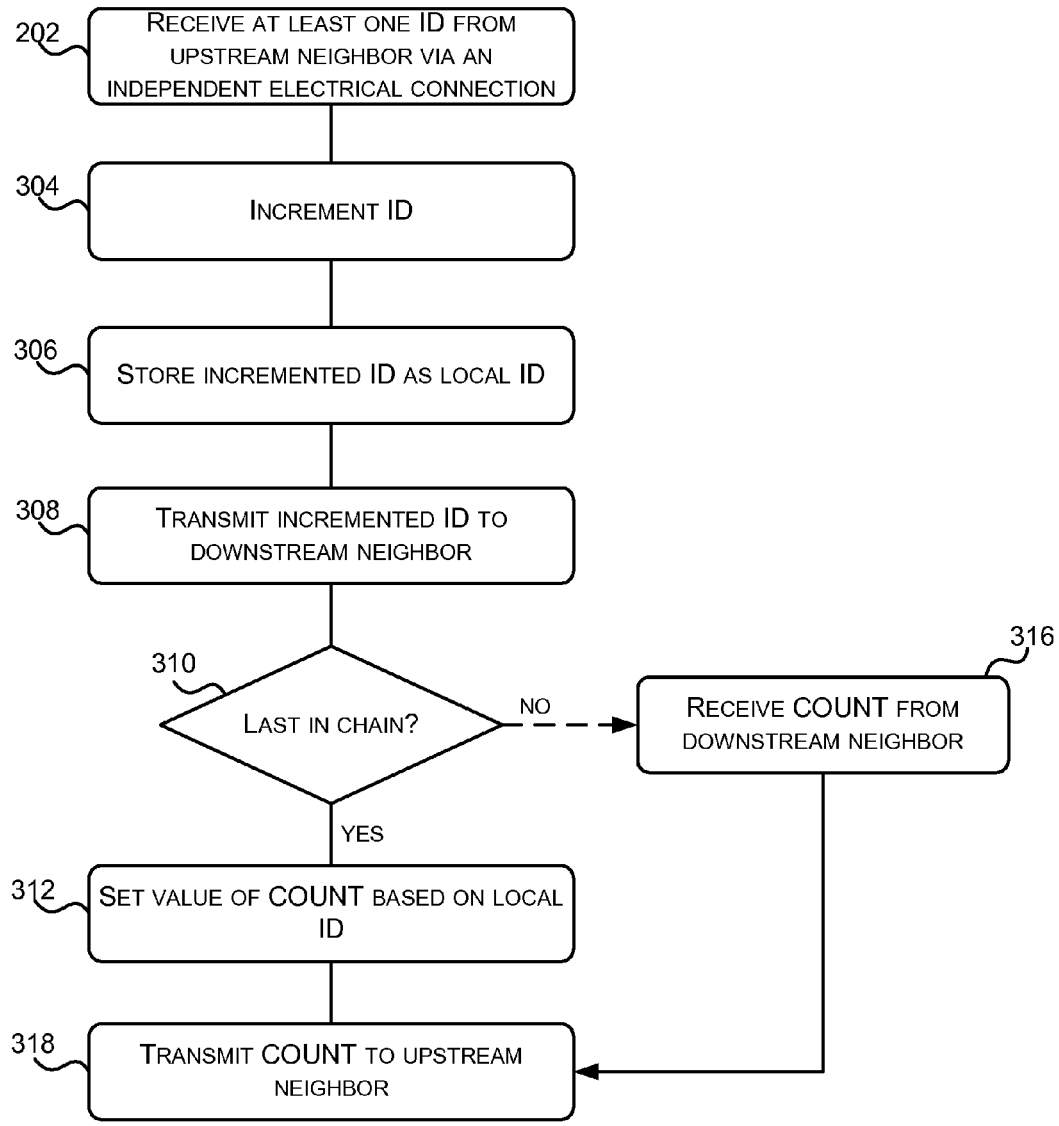

FIGS. 3 and 4 comprise flow diagrams of further example methods of automatic address assignment for devices connected by a shared bus 108 and by independent electrical connections 110 between neighboring devices. Through use of the methods shown in FIGS. 3 and 4, each device in the chain knows how many devices there are in the chain in addition to the position of the device in the chain. Many shared buses, e.g. I²C, typically use a single-master, multi-slave protocol. In dynamic configurations, it is useful for the master to be able to determine at runtime how many slave devices it has and to be able to address them in location order. However, the shared bus itself is not well-suited to determining this, since it is a single electrical connection which is unable to differentiate between devices. The use of a neighbor bus in conjunction with the method of FIG. 3 or 4 provides this functionality.

In the example method shown in FIG. 3, the ID received from an upstream neighbor (in block 202, via the neighbor bus 110) is stored as the local ID (block 302) and then incremented (block 304, e.g. by one), before the incremented ID is transmitted to a downstream neighbor (block 308, via the neighbor bus 110). As described above with reference to block 208 in FIG. 2, additional IDs may, in some examples, be transmitted (in block 308) in addition to the incremented ID. If the device is the last in the chain (as determined in block 310), the number of devices in the chain, COUNT, is set based on the local ID of the device (block 312, e.g. COUNT=local ID). If the device is not the last in the chain, the device waits to receive the number of devices in the chain (COUNT) from the downstream neighbor (in block 316). Having set the value of COUNT, (in block 312 or 316) this is communicated upstream via the neighbor bus (block 318). The example method shown in FIG. 4 is very similar to that shown in FIG. 3 and described above, except that the ID received is incremented (in block 304) before being stored as the local ID (block 306).

The methods shown in FIGS. 3 and 4 may be repeated at each device in the chain in turn in order to automatically assign addresses which can subsequently be used for communication over the shared bus and also to communicate the number of devices in the chain, COUNT, upstream towards the master, i.e. to perform automatic topology discovery. When the first slave device in the chain receives the value COUNT from a downstream neighbor, the first slave in the chain may communicate the device count to the master or may wait for a request for this information via the shared bus (as described below).

There are many ways that a device may determine whether it is the last in the chain (in block 310). In one example, if the device does not receive a response to the transmission of the incremented ID (in block 308), the device concludes that it is the last in the chain (e.g. as in the example described below with respect to FIGS. 5 and 6). In another example, keep alive messages may be sent over the independent electrical connections between neighboring devices and where no keep alive messages are received over the downstream neighbor bus (i.e. over the independent electrical connection between the device and its downstream neighbor), it may be concluded that the device is at the end of the chain. In examples where the detection (in block 310) is not based on the failure to receive an acknowledgement in response to the transmission of the incremented ID (in block 308), the methods of FIGS. 3 and 4 may be modified such that the determination in block 310 may occur earlier and the incremented ID is not sent to a downstream neighbor (in block 308) if it is already known that there is no downstream neighbor. In this case, in the method of FIG. 3, it is also not necessary to generate the incremented ID (in block 304) where it is already known that the device is the last in the chain.

In some examples, the first device in a chain may not have an ID of one and in which case the value of COUNT may not be set equal to the local ID (in block 312) but may be determined in another manner based on the local ID. Alternatively, the value of COUNT passed upstream along the chain may still be set equal to the local ID of the last device in the chain (in block 312) but may not be equal to the number of devices in the chain. In such an instance, as the master knows the initial ID passed to the first device in the chain it can therefore calculate the number of devices in the chain from the initial ID and the value of COUNT received. In order that slave devices in the chain can also perform this calculation, the ID of the first slave in the chain may be communicated downstream along the chain (e.g. as one of the IDs received in block 202 and transmitted in block 208 or 308). In another example, the ID of the first slave in the chain may be communicated downstream along the chain and the final device in the chain may use this value and its own local ID to compute a value of COUNT which is equal to the number of devices in the chain (in block 312) before transmitting the value of COUNT to its upstream neighbor (in block 318).

Although the examples shown in FIGS. 3 and 4 involve incrementing the IDs at each device (in block 304), it will be appreciated that this is just one example of a way of determining a new ID based on the ID (or IDs) received from an upstream neighbor device and in variations of the methods shown in FIGS. 3 and 4, other methods of determining a new ID (such as any of the examples described above with reference to FIG. 2) may alternatively be used in place of block 304.

FIGS. 3 and 4 show two example ways in which the number of devices in the chain may be communicated to all devices in the chain and/or the master. In another example, the addresses of each device in the chain may be communicated downstream and the COUNT computed based on this information at the last device in the chain. In a further example, the addresses of each device in the chain may be communicated upstream to the master.

Figure 5:
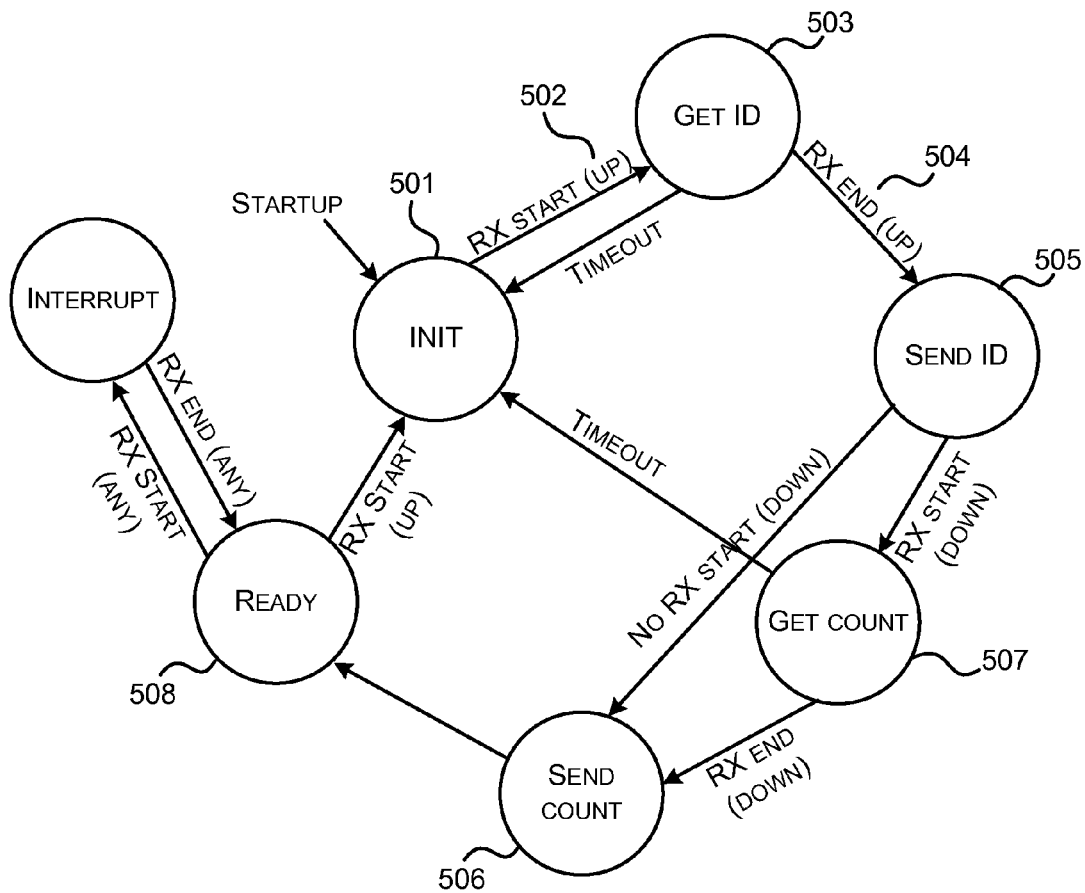
FIG. 5 shows a state diagram which is an alternative representation of the method shown in FIG. 3.

FIG. 5 shows a state diagram which is an alternative representation of the method shown in FIG. 3 and which can be described with reference to FIG. 6.

Figure 6:
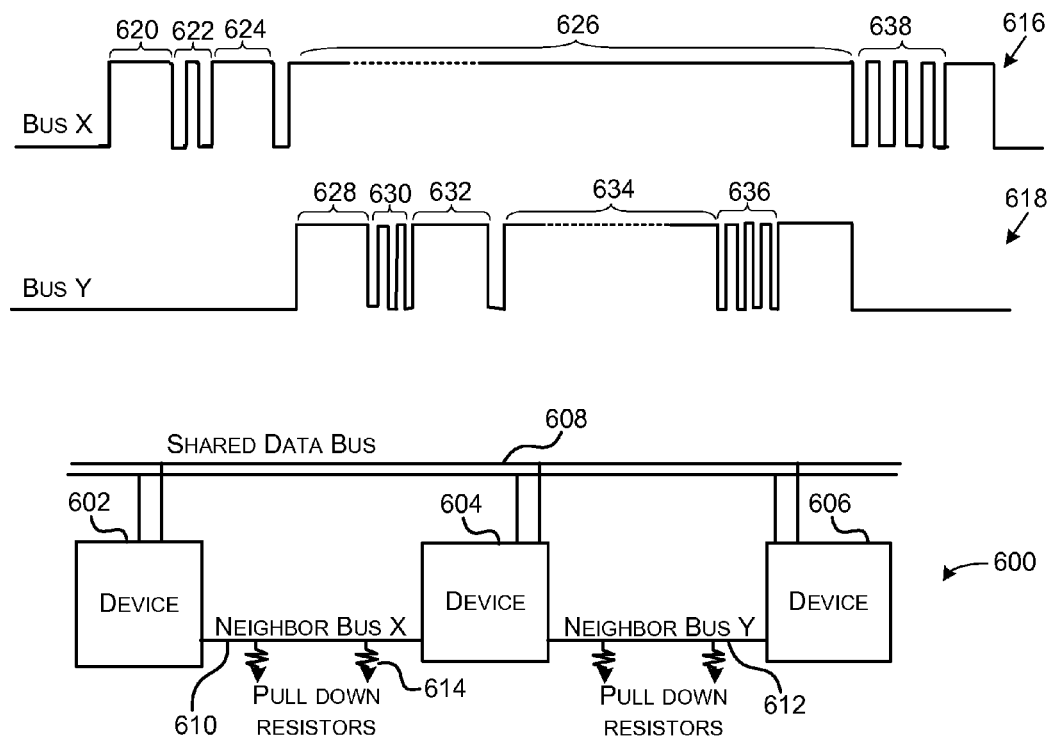
FIG. 6 shows a schematic diagram of another example system comprising a plurality of devices connected together using a shared bus and a neighbor bus and also shows example signals on the neighbor bus.

FIG. 6 shows a schematic diagram of another example system 600 comprising a plurality of devices (or components) 602, 604, 606 connected together using a shared bus 608 and a neighbor bus 610, 612. In the example shown, the neighbor bus is implemented as an "open source" bus with pull down resistors 614 (e.g. 10 kΩ resistors) so that the devices either drive "high", (e.g. 3.3V), logic one or do not drive the bus, in which case it is pulled down by the resistors to "low", 0V, logic zero. In the example shown there are two pull down resistors on each bus (each device has pull down resistors on both its upstream and downstream neighbor bus) and this ensures correct operation if a device has no downstream neighbor. It will be appreciated, however, that the system could alternatively use an "open drain" bus with pull up resistors instead of pull down resistors. FIG. 6 also shows example signals 616, 618 on the two neighbor buses 610, 612 respectively for the "open source" configuration.

Considering the central device 604, the device starts in 'INIT' state 501 and receives an RX start (arrow 502) in the form of a long high signal 620 from the upstream neighbor device 602 which moves the device 604 to state 'GET ID' 503. The device 604 then receives its new ID as a number of subsequent low to high transitions 622 (two in the example shown). The last high pulse 624 is long which acts as the RX end signal (arrow 504) and moves the state of the device 604 to 'SEND ID' 505. In this state, the device 604 holds the upstream neighbor bus 610 high 626 to indicate that it is present to its upstream neighbor device 602 (i.e. so that the neighbor device 602 knows that it is not at the end of the chain). The device 604 also sends out a long transmission start pulse 628 downstream followed by a number of low to high transitions 630 corresponding to its new ID (two) plus one (i.e. three, which is the ID of the next device 606) with the final pulse 632 being a long one to indicate the end of the transmission.

The device 604 then checks its downstream bus 612 to see if it sees a high pulse; if not, then it would conclude that there is no downstream bus (i.e. that device 606 is not present) and move to 'SEND COUNT' 506 and send upstream its COUNT of devices on the bus (equal to its ID). If it does see a high pulse (as in the example, where device 606 holds the bus high 634), then it moves to 'GET COUNT' state 507 where it waits for the downstream device 606 to execute the protocol on its downstream side (not shown in FIG. 6), and finally receives the COUNT from the downstream device 606 in the form of a series of low to high transitions 636 (in this case 4, indicating that there is one further device in the chain which is not shown in FIG. 6) and moves then to 'SEND COUNT' 506 and forwards on the information that there are 4 devices on the bus to the upstream device 602 in the form of a sequence of low to high transitions 638.

Once this set-up phase is complete, the devices move into 'READY' state 508 where they are able to communicate over the shared bus with their new addresses, and the master can control them using this shared bus. Beyond the set-up phase the neighbor bus may be used for signaling between devices, as described in more detail below.

As described above, the master may clock out the initial SET ID pulses as above, and may receive the COUNT from the first slave in the chain. However, in an implementation the master may simply check for the neighbor bus to be idle (low) for a long time rather than trying to read in the COUNT. This is because the master is expected to have other functions going on and rather than synchronously monitoring the bus and failing to perform the other functions, it can instead only occasionally check it. Once it is low for a long time, the shared bus may be used to query the device at the first ID. If it receives no response then it knows that there are no devices on the bus, while it receives a response then it reads that device's COUNT to determine how many devices are on the bus.

Figure 7:
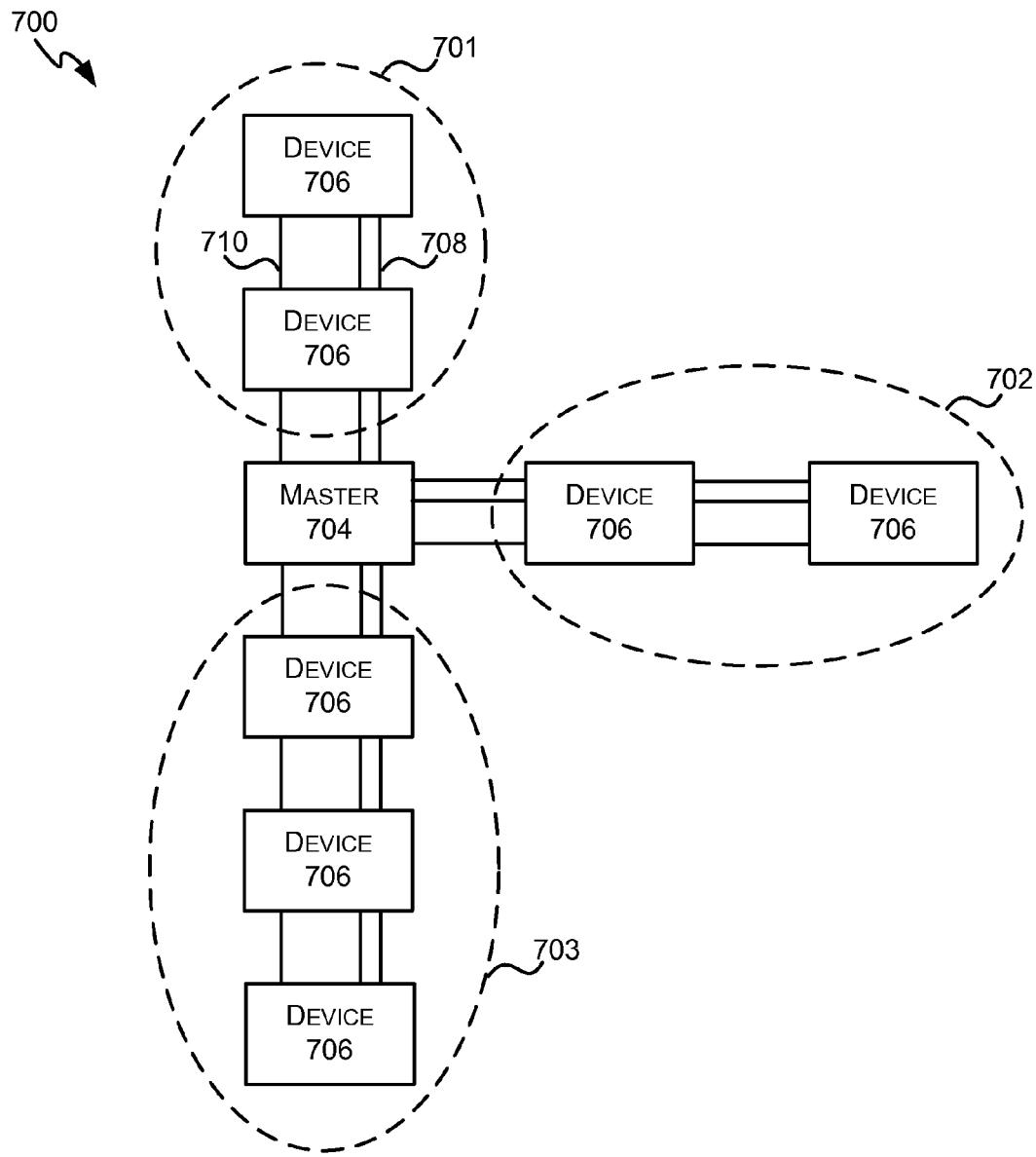
FIGS. 7, 9 and 10 are schematic diagrams of further example systems comprising a plurality of devices connected together using a shared bus and a neighbor bus.
Figure 8:
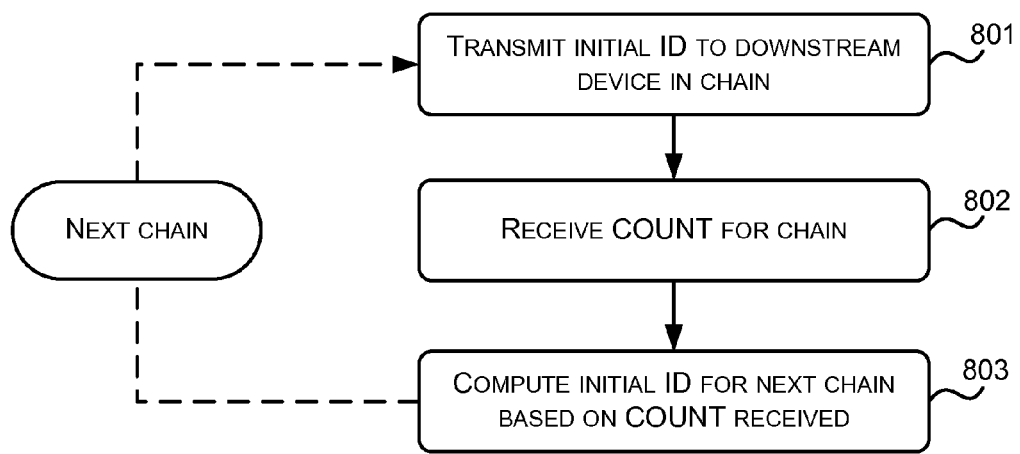
FIG. 8 is a flow diagram of an example method of operation of a master device.

The methods and systems described above comprise a single chain of devices; however, the methods are also applicable to systems which comprise multiple independent chains of devices which are all connected by the same shared bus, as shown in the schematic diagram of FIG. 7. The system 700 in FIG. 7 comprises three independent chains of devices 701-703 where all the devices 704, 706 are connected by a shared bus 708 and neighbors are connected by a neighbor bus 710. The master 704 supports multiple chains by automatically assigning addresses to each chain in turn such that for the second and subsequent chains, the first slave device in the chain is assigned an ID which is higher than (e.g. one higher than) the device count (COUNT) from the previous chain, as shown in the example flow diagram in FIG. 8.

Using the protocol shown in the method of FIG. 3 (by way of example), the master 704 transmits (in block 801) an initial ID of '1' to the first slave device 706 in the first chain 701 (as received in block 202). The COUNT which is transmitted back down the chain is '2' (the ID of the last slave device in this chain 701) and once this value is known by the master (as received in block 802), the master sets the value of a parameter TOP_GLOBAL_ID (i.e. the highest ID already assigned to a device) equal to COUNT ('2' in this example). To start a new chain, e.g. chain 702, the master 704 computes an initial ID value for the next chain (in block 803), which may, for example, be equal to TOP_GLOBAL_ID+1 ('3' in this example). This new initial ID is then sent to the first slave device in the next chain 702 (in block 801) and depending on how the protocol is implemented (e.g. how the value of COUNT is determined in block 312), the second chain 702 may return a COUNT of '2' (the number of devices in the chain) or '4' (the ID of the final device in the chain). On receiving this information (in block 802), the master updates the value of TOP_GLOBAL_ID (to '4' in this example) and the process is repeated for the third chain 703 (block 803 followed by block 801). Thus, through use of the neighbor bus 710 and protocols as described above (and shown in FIGS. 2-4 and 8), each device 706 has an automatically assigned unique address which can be used for addressing purposes on the shared bus 708 irrespective of which chain they belong to.

Figure 9:
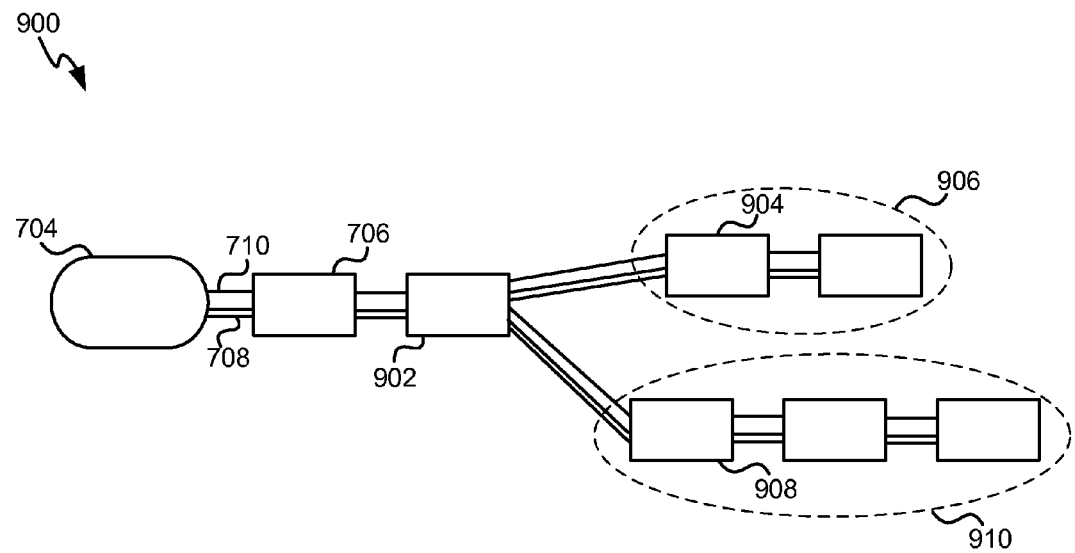

The methods described above may also be applied to chains which include branches, as shown in the system 900 of FIG. 9 with slave devices at the point where branching occurs operating in a similar manner to the master as described above with reference to FIGS. 7 and 8. Where a device 902 has two downstream neighbors 904, 908, the device proceeds to transmit an incremented ID to a downstream neighbor 904 in the first branch 906 (e.g. as in block 308 or block 801) and the protocol continues to work along the branch to the end assigning addresses to each device in turn. When the value of COUNT is transmitted back to the device 902 where branching occurs (e.g. as received in block 316 or block 802), the device 902 then transmits an ID to its second downstream neighbor 908 (in block 801). Depending on the way that the COUNT is transmitted upstream and the way that IDs are computed, the ID transmitted to the second downstream neighbor 908 (and computed in block 803) may be the value of the COUNT (which is then incremented by the downstream neighbor in block 304 before being stored as a local ID, as in FIG. 4) or may be an incremented value, e.g. COUNT+1 (which is then stored as the local ID of the downstream neighbor in block 302, as in FIG. 3). The value of COUNT which is received from the second branch 910 by the device 902 where the branching occurs (in block 802) is the value which is transmitted upstream towards the master device (e.g. in block 318).

In the examples described above, each system comprises a master device which sends out an initial ID (in block 801) which is used by the first slave device to determine its local ID (in block 204, 302 or 304-306). The methods described above may, however, be used in systems which do not comprise a master device or where the devices are capable of acting as slaves or as a master. In such systems, one device may be identified to initiate the automatic addressing method by each device performing a discovery operation over the neighbor bus to determine whether it has an upstream neighbor. In this instance, upstream and downstream may be defined arbitrarily but identically for each device such that the "upstream neighbor bus" for one device is the "downstream neighbor bus" for one of its neighboring devices and the device's "downstream neighbor bus" corresponds to the "upstream neighbor bus" for the other of its neighboring devices. When a device identifies that it has no upstream neighbor, it operates as if it is the master by generating an initial ID and transmitting it to its downstream neighbor (as in block 801 of FIG. 8). Other devices in the chain which do have a downstream neighbor can then operate as described above (e.g. as shown in FIGS. 2-6).

There are many ways in which the determination of whether a device has an upstream neighbor can be performed and similar methods may be used as described above with reference to detection of a downstream neighbor in block 310 of FIGS. 3 and 4. Examples include use of keep alive messages over the neighbor bus, sending a message over the neighbor bus and awaiting an acknowledgement, etc. In the configuration shown in FIG. 6, a device 604 may hold the upstream neighbor bus 610 high or pulse the upstream neighbor bus and then await a response in the form of a pulse generated by an upstream neighbor device 602. In another example, medium size pulses may be used as keep alive messages.

Figure 10:
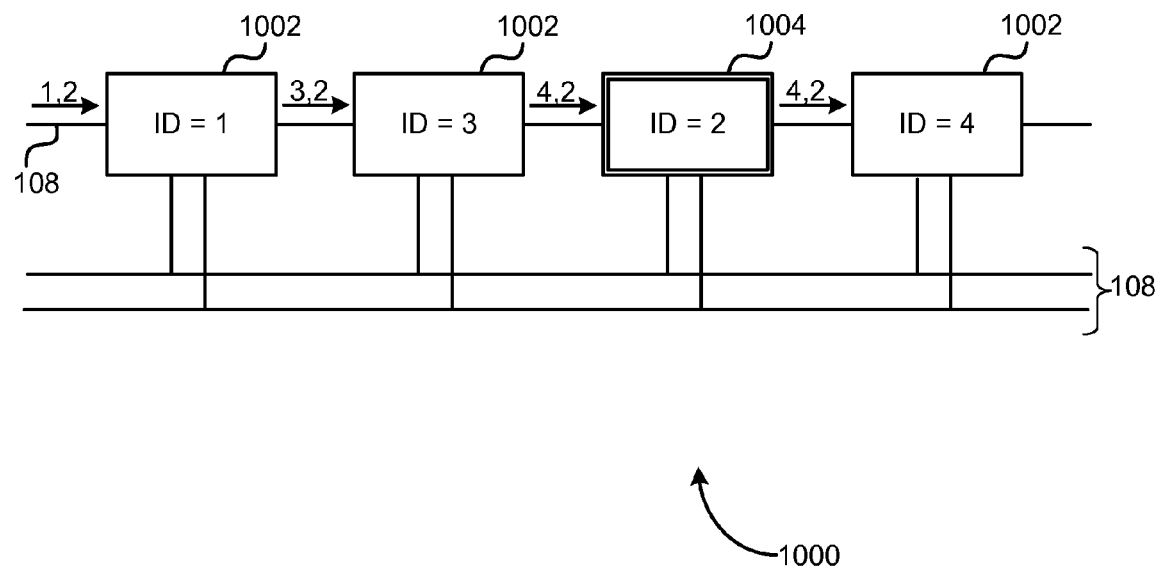

In the examples described above, each device in the chain is automatically assigned an address. Some devices, however, may have a fixed address and the methods described above can be adapted to automatically assign addresses to the other devices in the chain whilst ensuring that each device has a unique address. FIG. 10 is a schematic diagram of such a system 1000 which comprises three devices 1002 for which addresses are automatically and dynamically assigned and one device 1004 with a fixed address (ID=2 in the example shown). Using the methods described above, the first device in the chain shown receives at two IDs from an upstream neighbor (block 202), one of which is an ID generated by the upstream neighbor and the other is an ID value which should not be used when allocating addresses (because it corresponds to the device of fixed address 1004). Based on these two IDs, the device determines its local ID (block 204 or 302, ID=1) and then generates an ID for the next device (block 210 or 304). In this case, the ID for the next device cannot be '2' as this is the ID value which is specified as not for use and therefore the generated ID is '3' and this is transmitted (along with the prohibited address ID=2) to the next device in the chain over the neighbor bus. This next device determines its local ID (ID=3) and then generates and transmits a new ID to the subsequent device 1006 which is the device with the fixed address. In this example, the device with the fixed address purely forwards on the IDs received to the next downstream device, but in other examples, the device with the fixed address may still increment the local ID, such that its downstream neighbor will have an ID=5, rather than ID=4 as shown in FIG. 10. In further examples, the device with the fixed address may not be connected to the neighbor bus only to the shared bus.

The methods described above may be considered the set-up phase for a chain of devices in which devices are automatically allocated addresses which can subsequently be used by the devices to communicate over the shared bus and by the master to control them using this shared bus. It will be appreciated that aspects of the methods described with respect to FIGS. 2-5 may be combined in any manner (e.g. the transmission of COUNT upstream as shown in FIGS. 3-5 may be used with the address allocation method shown in FIG. 2 which does not require that new IDs are determined by incrementing the ID by one at each device).

Use of the methods described above to automatically assign addresses to devices in a chain, where the address of a device maps to a position of the device in the chain can simplify the writing of software to control the devices, particularly where there are multiple instances of the same device, such as in the 100 LED scenario described above. In such an example, the code may be written to refer to each device (e.g. each LED) by its position in the chain and the engineer writing the code does not need to know any other information about the configuration of the system. In some examples, the order in which devices are declared within the software may correlate to the position of the device in the chain, thereby enabling automatic addressing of devices both within the hardware instantiation (as described above) and in the software. In some examples, where the software is written before the system is assembled, the person performing the assembly need only refer to the software declarations and connect slave devices in a chain (connected to the master) in the order in which the devices are declared. In other examples, instead of the software including declarations for each device individually, the software can instead use a software library call to receive an array of such devices (which may be of the same type or different types). The neighbor bus address assignment procedure described above can then be used to create and populate this array, where the index of the array corresponds to the position of the device on the bus. Thus, software can easily be written which handles a variable number of devices attached to the bus without the need for reprogramming.

In addition to, or instead of, using the neighbor bus to automatically assign addresses to devices and/or determine the number of devices in a chain, the neighbor bus may be used for signaling between devices and this signaling may be described as 'out of band' signaling as it does not use the shared bus. This signaling may be unidirectional (e.g. upstream) or bidirectional (i.e. upstream and downstream), may be between slave devices in the chain and/or between a slave device and the master and may be signaling between neighbors or global signaling which augments the functionality of the shared bus. Signaling over the neighbor bus of the master by any device means that the master does not need to poll all the slaves continuously to determine if they have data to send.

In some examples, the unique device addresses (which may have been assigned over the neighbor bus or using an alternative method) may be used by the master to configure devices in the chain (via the shared bus) to forward and/or consume signals received on the neighbor bus and devices may be configured to respond differently (e.g. in terms of forwarding or consuming etc) depending on whether the received signal is traveling upstream or downstream. For example, if a device sees an interrupt signal on the upstream or downstream bus (e.g. if either bus has a pulse high in the configuration shown in FIG. 6) then they can forward and/or consume this signal depending on how the master has configured them (using the shared bus). A device's configuration may also determine whether the device can generate their own upstream or downstream signals on the neighbor bus depending on their own hardware (e.g. light falls on light sensor and causes signaling upstream over the neighbor bus). It will be appreciated that in some examples, this configuration of devices may not be performed over the shared bus but may use an alternative method (e.g. manual configuration).

In an example scenario, a device designer could have a robot arm with two motors, each with two "end stop" sensors (for sensing that the motor should stop moving as the arm has reached the mechanical limits of its capabilities). The automatic addressing methods described above permit easily connecting these up as MOTOR1-SENSOR1A-SENSOR1B-MOTOR2-SENSOR2A-SENSOR2B. Using the configuration of a shared bus and neighbor bus (as described above), the devices are "daisy chained" and only a single cable (including the shared bus and the neighbor bus) needs to run down the robot arm, making the physical design simpler and cheaper. After the address determination is complete (as described above), the sensors can be configured to send signals upstream using the neighbor bus when they are triggered, and the motors can be configured to automatically stop moving when the neighbor signal arrives. The sensors are configured to forward on the signals they receive, while the motors are configured not to forward on the neighbor signal. Thus, if SENSOR2B triggers and sends a signal, then SENSOR2A forwards it to MOTOR2, which stops, but does not forward it further. This arrangement permits a very tight loop, real-time control system between sensors and their associated motors (with real-time interrupts), which the master device would not easily be able to provide over a shared bus like I²C. For example, using I²C, the master would have to consume its processor cycles to poll each sensor constantly, and then signal the motor, and if the master is executing simultaneous tasks, this may introduce undesirable delays in the stopping of the motor. Using the neighbor signaling (along the neighbor bus), a local signal is automatically sent and acted upon in "end stop" situations without the master's involvement.

In an example implementation, the master device may be an ARM core running the Microsoft .NET Micro Framework runtime and custom software to perform the protocol used over the neighbor bus (as described above). A Cypress Semiconductor Programmable System on Chip (PSoC) may be used to implement the protocol on the slave (or peripheral) devices.

Figure 11:
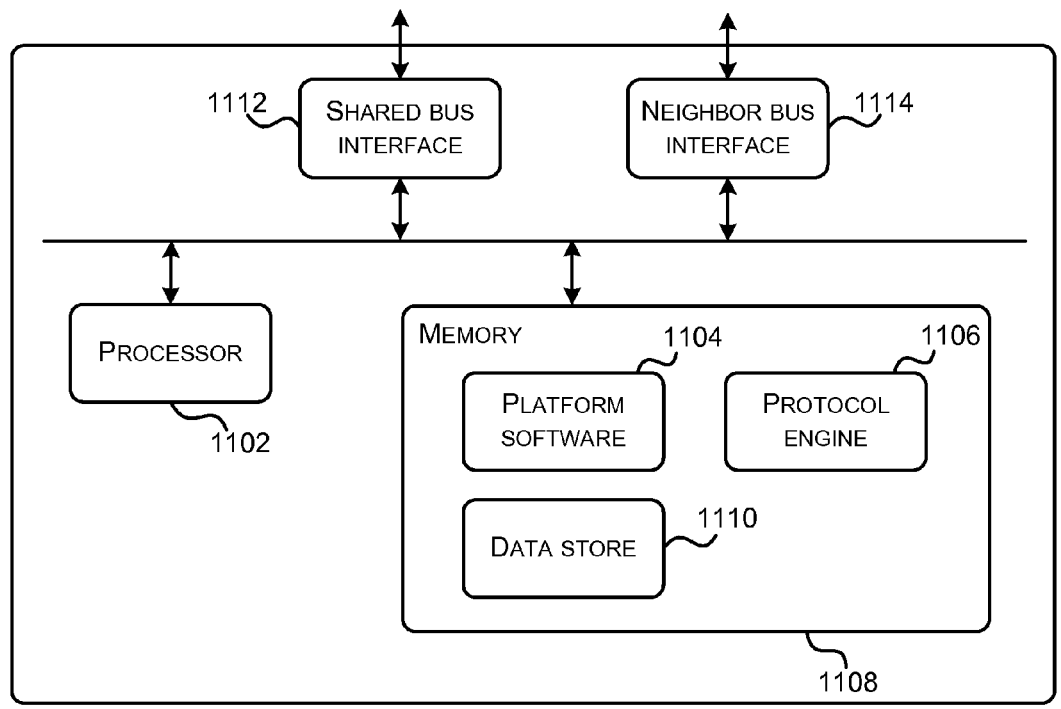
FIG. 11 illustrates various components of an exemplary computing-based device in which embodiments of the methods of automatic addressing described herein may be implemented.

FIG. 11 illustrates various components of an exemplary computing-based device 1100 which may be implemented as any form of a computing and/or electronic device, and in which embodiments of the methods of automatic addressing described above may be implemented.

Computing-based device 1100 comprises one or more processors 1102 which may be microprocessors, controllers or any other suitable type of processors for processing computing executable instructions to control the operation of the device in order to implement the protocols described herein (e.g. an ARM core or PSoC). Platform software 1104 (such as an operating system or any other suitable platform software) may be provided at the computing-based device to enable software which implements the protocol, referred to as the protocol engine 1106, to be executed on the device.

The computer executable instructions may be provided using any computer-readable media that is accessible by computing based device 1100. Computer-readable media may include, for example, computer storage media such as memory 1108 and communications media. Computer storage media, such as memory 1108, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transport mechanism. Although the computer storage media (memory 1108) is shown within the computing-based device 1100 it will be appreciated that the storage may be distributed or located remotely and accessed via a network or other communication link.

The memory 1108 also comprises a data store 1110 which may be used to store the local ID of the device 1100 during execution of the protocol. The computing-based device 1100 also comprises a shared bus interface 1112 and a neighbor bus interface 1114.

Figure 12:
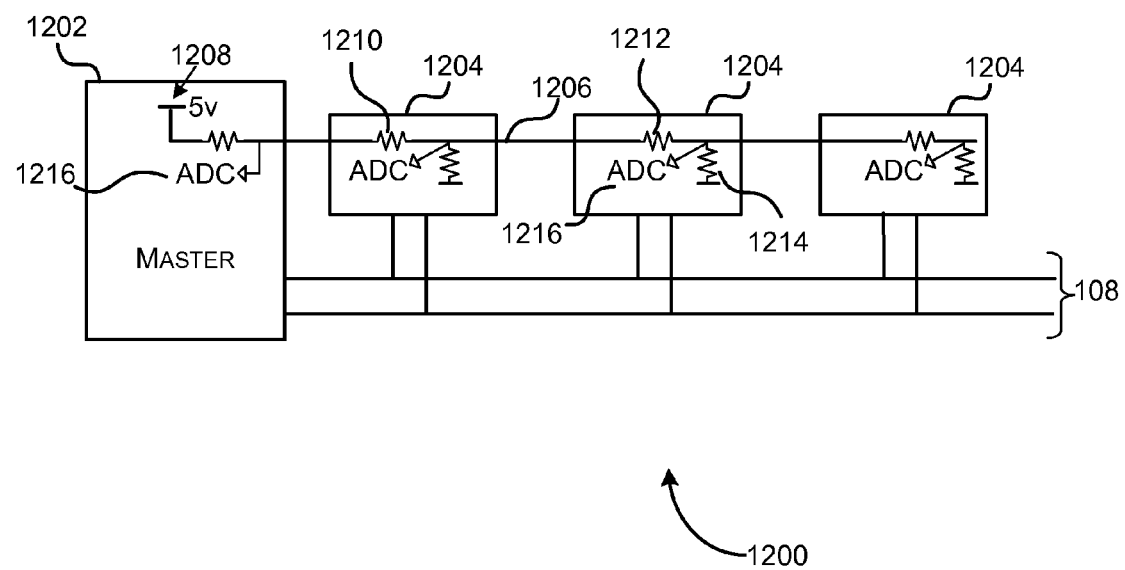
FIG. 12 shows an alternative arrangement of devices in a chain in which analogue methods may be used to assign an address to a device and to determine a devices position in the chain.

FIG. 12 shows an alternative arrangement of devices in a chain in which analogue methods may be used to assign an address to a device and to determine a devices position in the chain. As in the examples described above, the master 1202 and each slave device 1204 is connected to a shared bus 108 and neighboring slave devices are connected by a neighbor bus 1206. The master 1202 provides a fixed voltage supply 1208 (5V in the example shown in FIG. 12) and comprises a resistor 1210 inline with the source voltage 1208. There is also an inline resistor 1212 and a pull-down resistor 1214 to ground in each slave device 1204. By sampling the voltage (e.g. using an ADC 1216 as shown in FIG. 12), the master can determine how many slave devices are connected in the chain and each slave device can determine where it is in the chain and hence determine its address. In a variation of that shown in FIG. 12, the slave devices 1204 may not comprise a pull-down resistor to ground and instead the bus may be connected to ground by a specific link which is made at the last slave device in the chain.

Although the present examples are described and illustrated herein as being implemented in systems in which the devices are connected in linear chains, the system described is provided as an example and not a limitation. As those skilled in the art will appreciate, the present examples are suitable for application in a variety of different types of systems comprising a plurality of devices connected by a shared bus. In some examples, the system may comprise tree configurations and/or loops back to the master (e.g. the master may be connected to both device 102 and device 106 in FIG. 1 to form a loop). Furthermore, any reference to I²C is by way of example only and the neighbor bus and protocol used on the neighbor bus described above are independent of the shared bus type and can hence be used with any shared bus.

It will be appreciated that although the neighbor bus is an independent electrical connection between neighbors (rather than being shared and providing a single electrical conductive path all the way along the chain), when implemented, the same physical connector may be used to provide both the shared bus connections and an additional line for the neighbor bus.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium, e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of automatically assigning addresses to devices connected by a shared bus and by an independent electrical connection between neighboring devices, the method comprising:
    receiving, at a device, at least one device address from a first neighboring device;
    determining a device address for the device based on the at least one device address received;
    storing the device address for the device;
    determining, at the device, if the device does not have a downstream neighboring device; and
    if the device does not have a downstream neighboring device, setting a parameter indicative of a number of devices in a chain based on the stored device address for the device and transmitting the parameter to the first neighboring device.

2. A method according to claim 1, further comprising:
    transmitting at least one device address to a second neighboring device.

3. A method according to claim 2, wherein determining a device address for the device comprises:
    setting the device address for the device to be equal to the device address received;
    and wherein the method further comprises:
    computing a new device address for transmission to the second neighboring device.

4. A method according to claim 3, wherein computing a new device address comprises incrementing the device address received by one.

5. A method according to claim 2, further comprising retransmitting the at least one device address to the second neighboring device in response to receipt of a trigger.

6. A method according to claim 1, further comprising, if the device does have a downstream neighboring device:
    transmitting at least one device address to the downstream neighboring device;
    receiving a parameter indicative of a number of devices in the chain from the downstream neighboring device; and
    transmitting the parameter to the first neighboring device.

7. A method according to claim 6, wherein the first neighboring device is a master device.

8. A method according to claim 1, further comprising using the independent electrical connection between neighboring devices for signaling between devices in the chain.

9. A method according to claim 8, wherein a device in the chain is configured to forward or consume a signaling message received from a downstream neighboring device over the independent electrical connection between the devices.

10. A device comprising:
    a connection to a shared data bus;
    an independent electrical connection to an upstream neighbor device on the shared data bus;
    a processing element adapted to determine an ID for the device based on at least one device ID received from the upstream neighbor device via the independent electrical connection and to determine the ID for the device by setting the ID equal to a device ID received from the upstream neighbor device; and
    a data store adapted to store the ID for the device.

11. A device according to claim 10, further comprising:
    an independent electrical connection to a downstream neighbor device on the shared data bus; and wherein the processing element is further adapted to transmit at least one device ID to a downstream neighbor device via the independent electrical connection.

12. A device according to claim 11, wherein the processing element is adapted to determine the ID for the device by setting the ID equal to a device ID received from the upstream neighbor device and wherein the processing element is further adapted to increment by one the ID for the device before transmitting the incremented device ID to the downstream neighbor device.

13. A device according to claim 11, forming part of a chain of devices and wherein the processing element is further adapted to receive data representative of a number of devices in the chain and to transmit the data to an upstream neighbor device via the independent electrical connection.

14. A device according to claim 10, forming part of a chain of devices, wherein the processing element is further adapted to compute data representative of a number of devices in the chain based on at least one of the at least one device ID received and the ID for the device and to transmit the data to an upstream neighbor device via the independent electrical connection.

15. A device according to claim 10, wherein the processing element is configurable over the shared bus to consume or forward signaling received via an independent electrical connection.

16. A chain of devices wherein each device in the chain is connected by a shared bus and pairs of neighboring devices in the chain are connected by independent electrical connections, and wherein at least one device in the chain is adapted to:
- receive a device ID from an upstream neighbor device;
- store the device ID;
- increment the received device ID to generate a device ID for a downstream neighbor device; and
- transmit the generated device ID to the downstream neighbor device,
- wherein a device in the chain acting as a master device is adapted to:
  - transmit an initial ID to a first downstream device in the chain;
  - receive data indicating a number of devices in the chain from the first downstream device; and
  - compute an initial ID for a first downstream device in a second chain of devices based on the received data.

17. A chain of devices according to claim 16, the data indicating a number of devices in the chain received from the first downstream device comprises the device ID of a last device in the chain.

* * * * *

UNITED STATES PATENT AND TRADEMARK OFFICE
CERTIFICATE OF CORRECTION

| | | |
|---|---|---|
| PATENT NO. | : 8,478,917 B2 | Page 1 of 1 |
| APPLICATION NO. | : 12/888042 | |
| DATED | : July 2, 2013 | |
| INVENTOR(S) | : Scott et al. | |

It is certified that error appears in the above-identified patent and that said Letters Patent is hereby corrected as shown below:

In the Specification,

In Column 12, Line 10, delete "inline" and insert -- in line --, therefor.

In Column 12, Line 11, delete "inline" and insert -- in line --, therefor.

Signed and Sealed this
Seventeenth Day of February, 2015

Michelle K. Lee
*Deputy Director of the United States Patent and Trademark Office*